United States Patent [19]
Katayama

[11] Patent Number: 5,353,267
[45] Date of Patent: Oct. 4, 1994

[54] MAGNETO-OPTICAL LIGHT DETECTOR APPARATUS

[75] Inventor: Ryuichi Katayama, Tokyo, Japan

[73] Assignee: NEC Corporation, Tokyo, Japan

[21] Appl. No.: 70,224

[22] Filed: Jun. 2, 1993

[30] Foreign Application Priority Data

Jun. 2, 1992 [JP] Japan .................................. 4-140832
Jul. 21, 1992 [JP] Japan .................................. 4-192554

[51] Int. Cl.$^5$ .............................................. G11B 17/32
[52] U.S. Cl. .................... 369/13; 369/44.41; 369/109; 250/201.5
[58] Field of Search .............. 369/13, 14, 109, 110, 369/44.11, 44.14, 44.41; 300/114, 59; 250/201.5, 201.1, 201.4

[56] References Cited

U.S. PATENT DOCUMENTS

| | | | |
|---|---|---|---|
| 4,959,821 | 9/1990 | Morimoto et al. | 369/13 |
| 4,989,189 | 1/1991 | Sander et al. | 369/13 |
| 5,066,138 | 11/1991 | Toide et al. | 369/44.14 |
| 5,123,003 | 6/1992 | Noda et al. | 309/109 |
| 5,153,863 | 10/1992 | Noda et al. | 369/109 |
| 5,185,729 | 2/1993 | Noda et al. | 369/109 |
| 5,270,996 | 12/1993 | Ono | 369/110 |

Primary Examiner—Robert J. Pascal
Assistant Examiner—Tan Dinh
Attorney, Agent, or Firm—Sughrue, Mion, Zinn, Macpeak & Seas

[57] ABSTRACT

In a magneto-optical head assembly, a source beam is directed onto a magneto-optical recording medium and light returning from it is focussed through a birefringent member to a light detector. The birefringent member is formed with a diffraction pattern for splitting incident light into a zeroth-order component and plus and minus first-order components. The light detector includes a first light sensing area having two sensors for receiving the zeroth-order component, a second light sensitive area having a first pair of diagonally arranged sensors and a second pair of diagonally arranged sensors for receiving one of the plus and minus first-order components, and a third light sensitive area having two sensors for receiving the other first-order component. In one embodiment, the birefringent member has an off-axis lens effect and is divided into two regions of different diffraction patterns and in a modified embodiment, it has a first diffracting plane for diffracting a particular polarization component of incident light and a second diffracting plane for diffracting a polarization component of light from the first plane which polarization component is oriented in a direction normal to the direction of orientation of that particular polarization component. Each diffracting plane has two regions different diffraction patterns.

10 Claims, 6 Drawing Sheets

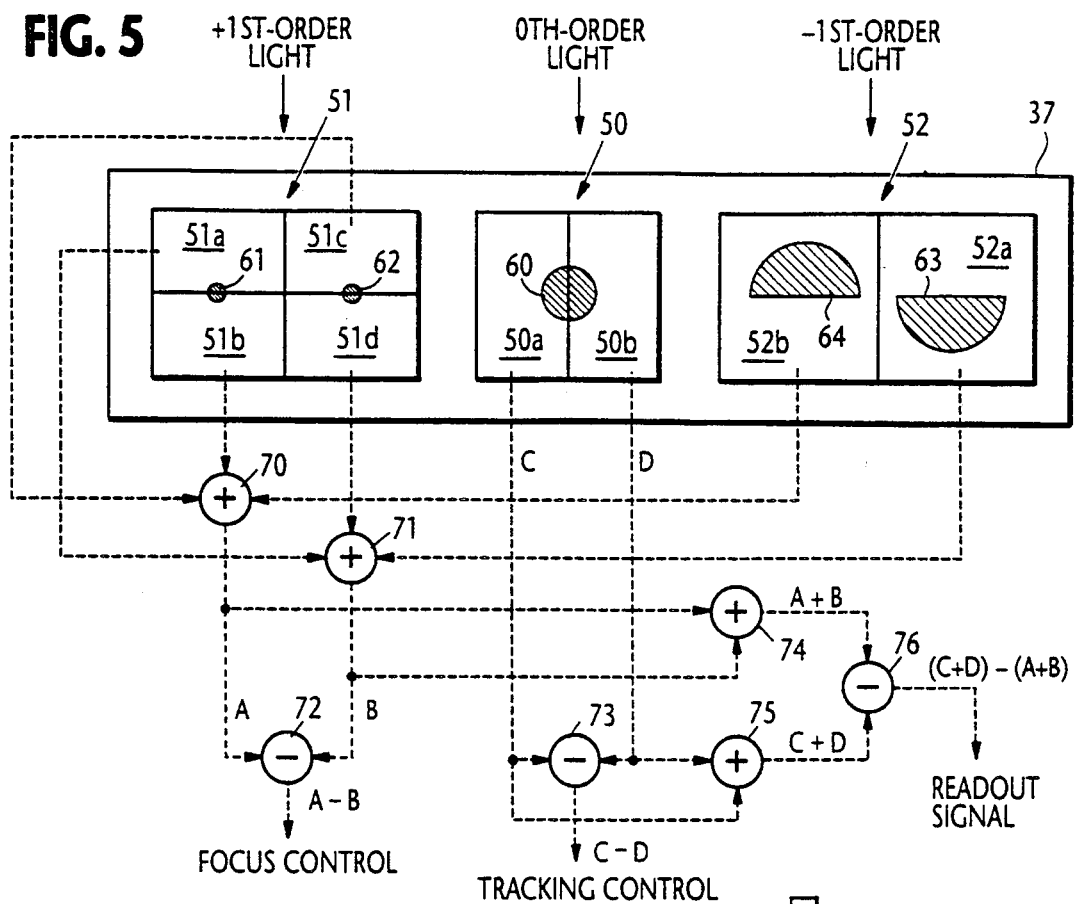
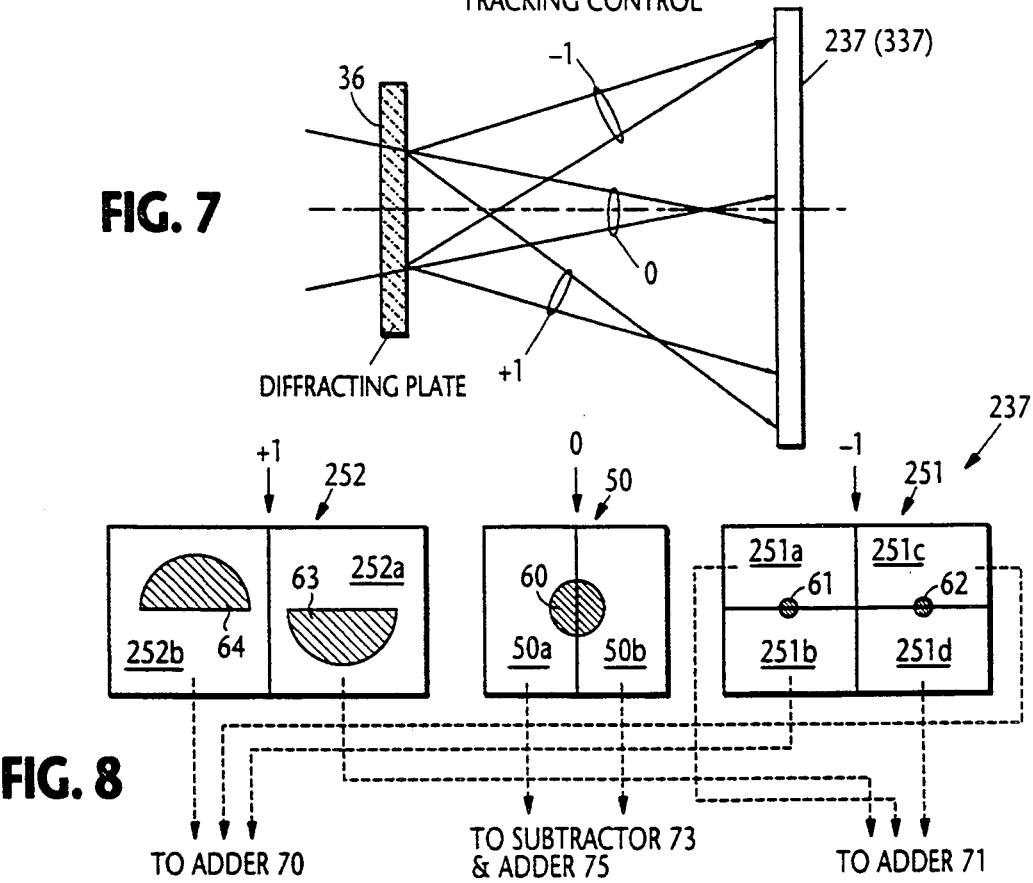

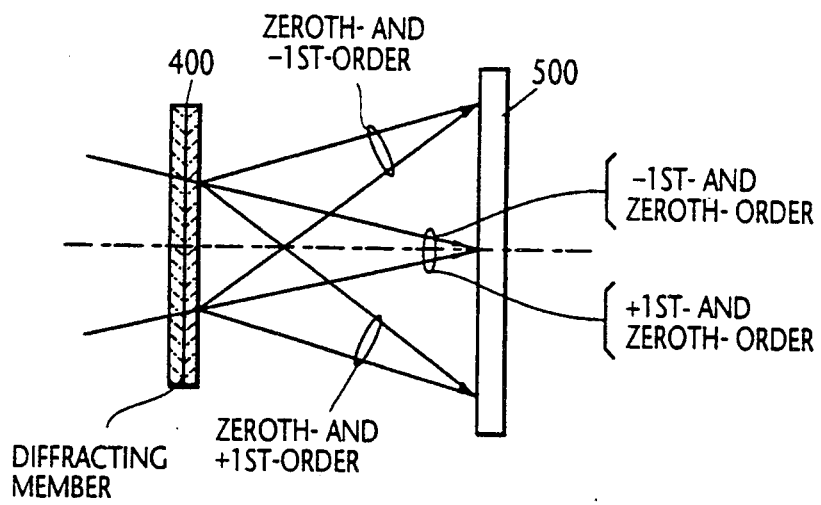
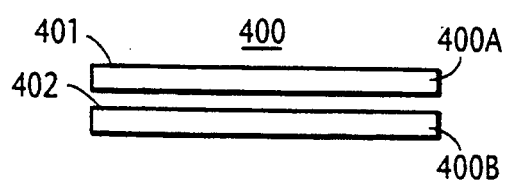
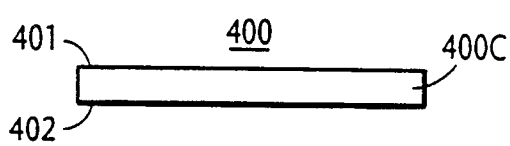
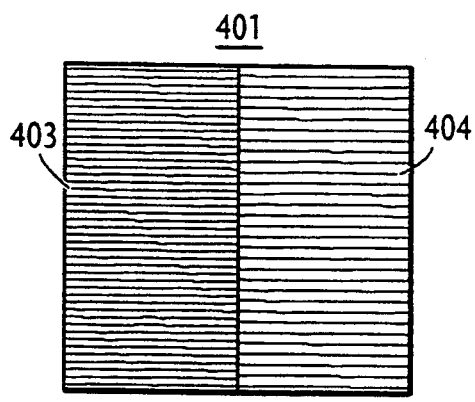
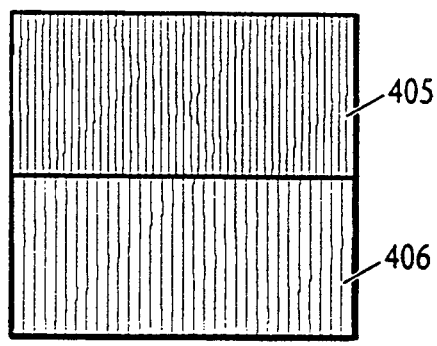
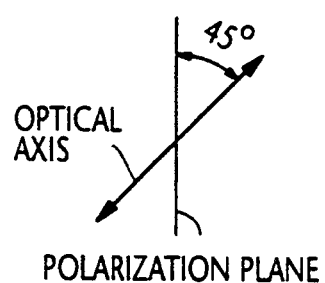
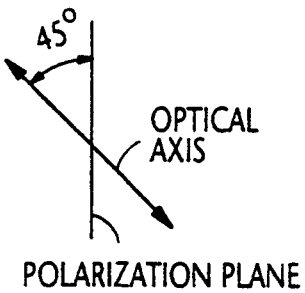

MAGNETO-OPTICAL LIGHT DETECTOR APPARATUS

BACKGROUND OF THE INVENTION

1. Field of the Invention

The present invention relates generally to magneto-optical disk head assemblies, and more specifically to a magneto-optical disk head assembly having improved frequency response characteristics.

2. Description of the Related Art

In a conventional head assembly for magneto-optical recording disks, the light from a semiconductor laser is collimated into a parallel beam, in which a beam splitter is located, and is focused onto the surface of a magneto-optical disk. Light rays reflecting off the disk are collimated and reflected by the beam splitter off to a birefringent holographic grating, or diffracting plate having different diffraction patterns 1 through 4 as illustrated in FIG. 1 and whose optical axis is at 45° to the polarization plane of the incident light. The light passing through the diffracting plate has three optical components, i.e., the undiffracted, zeroth-order component (ordinary light) and the plus first-order and minus first-order diffracted components (extraordinary rays), which impinge on light sensors 5, 6 and 7, respectively, arranged on a light detector such that the zeroth-order component forms a light spot 10 on sensor 5, the plus first-order component forming spots 11-14 on sensor 6, and the minus first-order diffracted component forming spots 15-18 on sensor 7. Specifically, the diffraction patterns 1-4 positionally correspond to light spots 11-14 on sensor 6, respectively, and further correspond to light spots 15-18 on sensor 7, respectively. The sensor 6 is subdivided into an upper sensor 6a illuminated with the spot 14, four adjoining intermediate sensors 6b-6e where the spots 11, 12 are formed, and a lower sensor 6f where the spot 13 is formed. By representing the electrical output signal from each light sensitive region as a voltage V with a subscript indicating the sensor from which it is generated, a focussing control signal, a tracking control signal and a readout signal are derived as follows:

Focussing control $= (V_{6b} + V_{6e}) - (V_{6c} + V_{6d})$

Tracking control $= V_{6a} - V_{6f}$

Readout signal $= V_5 - (V_{6a} + V_{6b} + V_{6c} + V_{6d} + V_{6e} + V_{6f} + V_7)$ As illustrated, the focussing control signal is derived by the use of adders 20 and 21 and a subtractor 22 from sensors 6b, 6e, 6c and 6d, and the tracking control signal is derived by a subtractor 23 from sensors 6a and 6f. The readout signal is derived by adders 20, 21 and 24 and a subtractor 25 from all the sensors by subtracting the signal indicating the sum of plus first-order and minus first-order components from the zeroth-order component signal.

Since one input of subtractor 25 is derived exclusively from the plus-minus first-order diffracted light components and the other input of the subtractor is derived exclusively from the zeroth-order light component, these subtractor inputs exhibit different frequency response characteristics. As a result, the readout signal suffers frequency dependent effects arising from the inherent intensity variation of the source laser and the common-mode noise due to variations of the disk's reflectivity.

SUMMARY OF THE INVENTION

It is therefore an object of the present invention to provide a magneto-optical head assembly having a noise-cancelling effect for eliminating frequency dependent in-phase noise.

According to the present invention, there is provided a magneto-optical head assembly wherein light from a light source is directed onto a magneto-optical recording medium and the light returning therefrom is focussed on a given plane. A birefringent member is located in the path of the returning light for splitting the light into a zeroth-order component and plus and minus first-order components. Located on the given plane is a light detector which comprises a first light sensing area having two sensors for receiving the zeroth-order component, a second light sensitive area having a first pair of diagonally arranged sensors and a second pair of diagonally arranged sensors for receiving one of the plus and minus first-order components, and a third light sensitive area having two sensors for receiving the other first-order component.

In one embodiment, the birefringent member has an off-axis lens effect and is divided into two regions of different diffraction patterns so that the plus and minus first-order components are respectively focussed on first and second focal planes and the zeroth-order component is focussed on a third focal plane located between the first and second focal planes.

Signals from a first pair of diagonally arranged sensors of the second light sensitive area and a signal from one of the sensors of the third light sensitive area are summed to produce a first sum signal, and signals from a second pair of diagonally arranged sensors of the second light sensitive area and a signal from the other sensor of the third light sensitive area are summed to produce a second sum signal. To produce a readout signal, the first and second sum signals are combined to produce a third sum signal which is then subtracted from a sum of signals from the sensors of the first light sensitive area. A focussing control signal is derived from the difference between the first and second sum signals, and a tracking control signal is derived from the difference between signals from the sensors of the first light sensitive area.

In a modified embodiment, the birefringent member has a first diffracting plane for diffracting a particular polarization component of light incident thereon and a second diffracting plane for diffracting a polarization component of light incident thereon from the first diffracting plane which is oriented in a direction normal to the direction of orientation of the particular polarization component. Each of the first and second diffracting planes is divided into two regions of different diffraction patterns so that each diffraction pattern splits the incident light into plus and minus first-order components.

The first light sensitive area of the modified embodiment is arranged to receive light spots that are formed by the zeroth-order component from the second diffracting plane as well as by the plus first-order components from the respective regions of the first diffracting plane. The second light sensitive area is arranged to receive light spots that are formed by the zeroth-order component from the first diffracting plane as well as by the plus first-order components from the respective regions of the second diffracting plane. The third light sensitive area is arranged to receive light spots which are formed by the zeroth-order component from the second diffracting plane as well as by the minus first-order components from the respective regions of the first diffracting plane. The light detector further comprises a fourth light sensitive area having a first pair of diagonally arranged sensors and a second pair of diagonally arranged sensors for receiving light spots formed by the zeroth-order component from the first diffracting plane as well as by the minus first-order components from the respective regions of the second diffracting plane.

In the modified embodiment, a first adder is provided for summing signals from the first pair of diagonally arranged sensors of the second light sensitive area and signals from the first pair of diagonally arranged sensors of the fourth light sensitive area. A second adder provides summation of signals from the second pair of diagonally arranged sensors of the second light sensitive area and signals from the second pair of diagonally arranged sensors of the fourth light sensitive area. A third adder provides summing on the output signals of the first and second adders and a fourth adder provides summing on signals from one of the sensors of the first light sensitive area and one of the sensors of the third light sensitive area. A fifth adder provides summing of signals from the other sensor of the first light sensitive area and the other sensor of the third light sensitive area, and a sixth adder provides summing of output signals of the fourth and fifth adders. A focussing control signal is derived from the difference between the outputs of the first and second adders, and a tracking control signal is derived from the difference between the outputs of the fourth and fifth adders. A readout signal is derived from the difference between the outputs of the third and sixth adders.

BRIEF DESCRIPTION OF THE DRAWINGS

The present invention will be described in further detail with reference to the accompanying drawings, in which:

FIG. 5 is a plan view of a light detector according to one embodiment of the present invention, together with a circuit for processing signals from the light detector;

FIG. 7 is a view showing a modified arrangement of the head assembly of FIG. 2;

FIG. 8 is a plan view of a modified form of the light detector of FIG. 5 incorporated in the arrangement of FIG. 7;

FIG. 10 is a view showing a further modification of the present invention;

FIGS. 11A and 11B are end views of the diffracting member of FIG. 10;

FIGS. 12A and 12B are plan views of the different planes of the diffracting member.

DETAILED DESCRIPTION OF THE INVENTION

Figure 1:
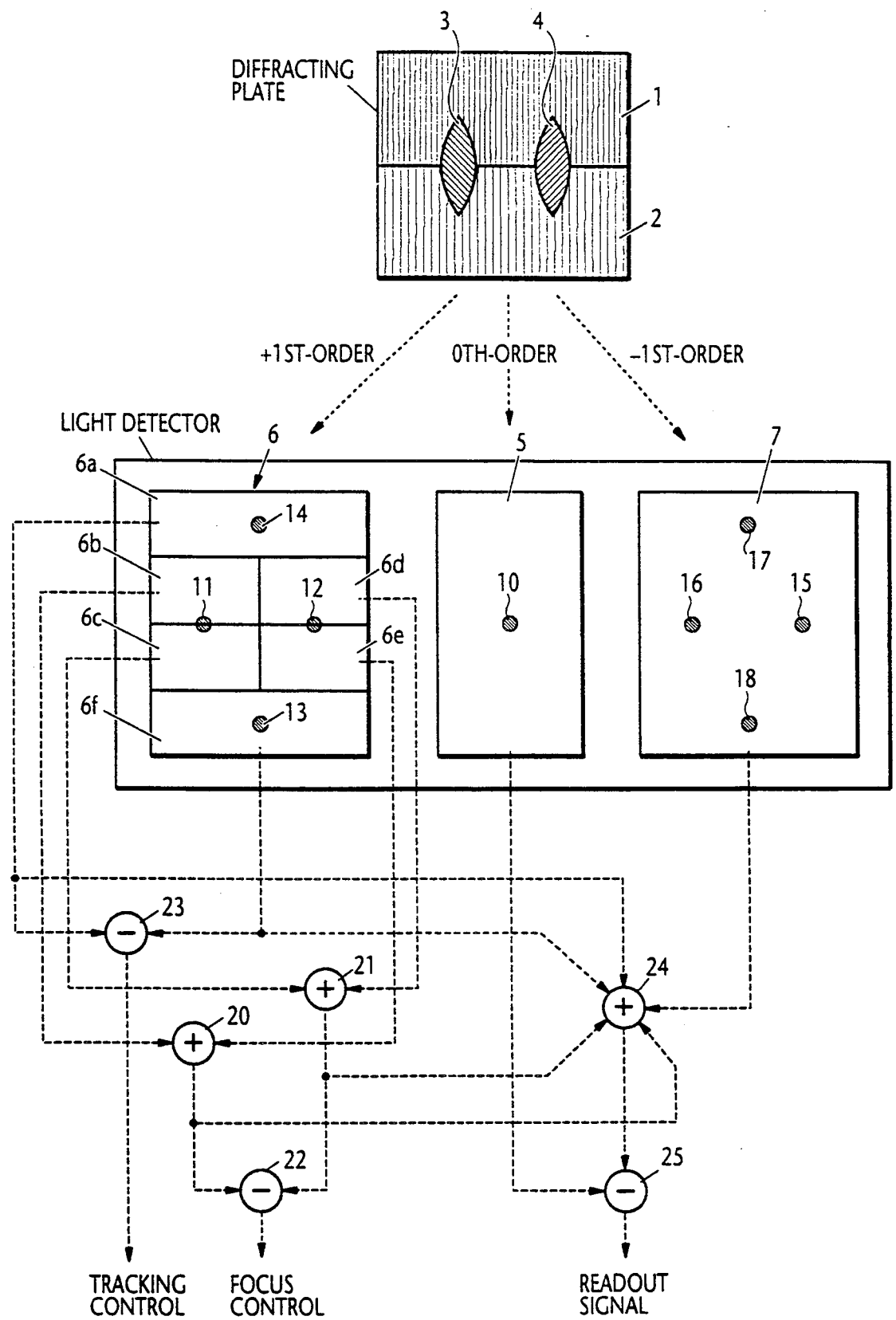
FIG. 1 is a view illustrating a prior art diffracting plate and a prior art light detector for a magneto-optical head assembly, together with a circuit arrangement for processing signals from the light detector.
Figure 2:
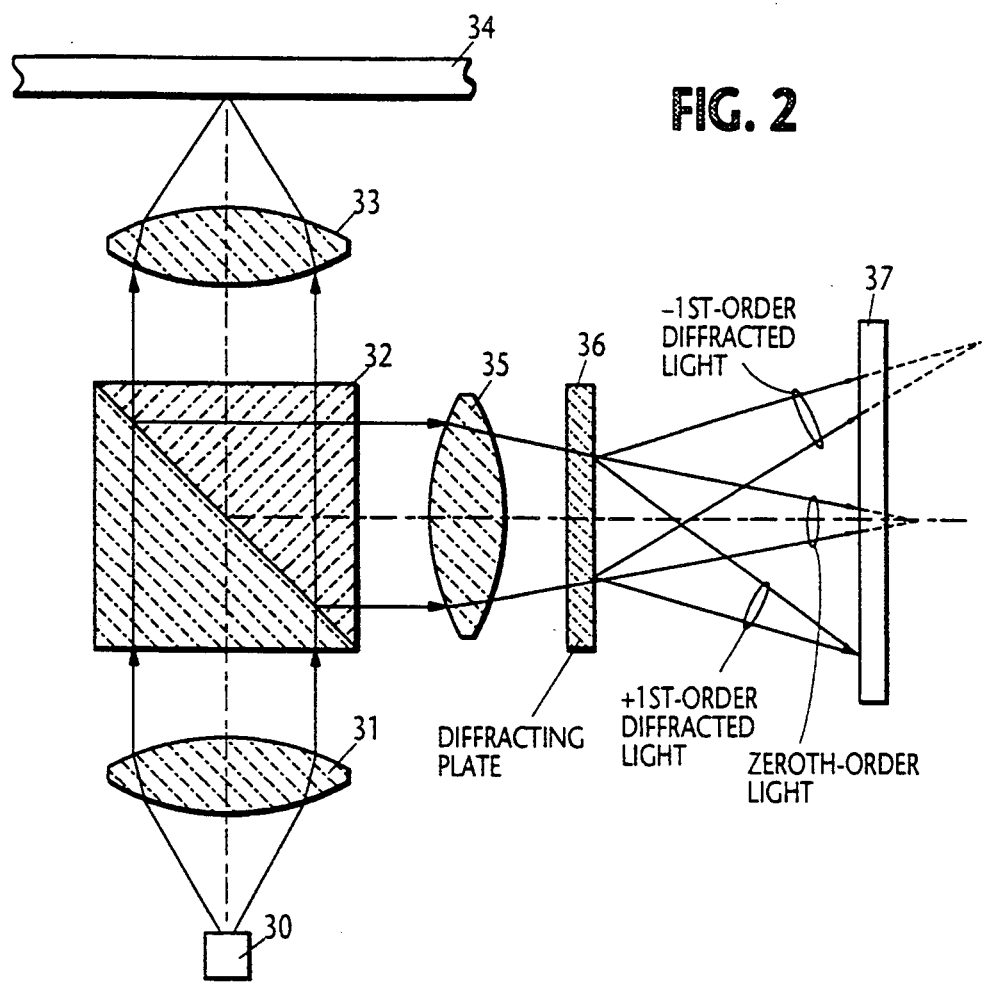
FIG. 2 is a magneto-optical head assembly incorporating a diffracting plate and a light detector according to an embodiment of the present invention.

In FIG. 2, a magneto-optical head assembly embodying the present invention comprises a semiconductor laser 30, a collimator lens 31 for forming the light from laser 30 into a parallel beam, and a polarizing beam splitter 32 located in the path of the parallel light. The parallel beam emerging from the beam splitter 32 is brought into focus by an objective lens 33 on a magneto-optical disk 34 where it is modulated and collimated again by the object lens 33 as it is reflected back towards the beam splitter 32. The latter reflects off the returning light at right angles to the direction of light from laser 30 and focussed by a lens 35 onto the surface of an opto-electrical converter, or light detector 37. Between lens 35 and light detector 37 is located a birefringent (polarizing) holographic diffracting plate 36 of the present invention, where the returning light is separated into a zeroth-order component and plus and minus first-order components (+45- and −45-degree polarized light components). The light detector 37 is located on the focal point of the plus first-order component so that the focal points of the zeroth-order and minus first-order components are behind the light detector 37.

Figure 3:
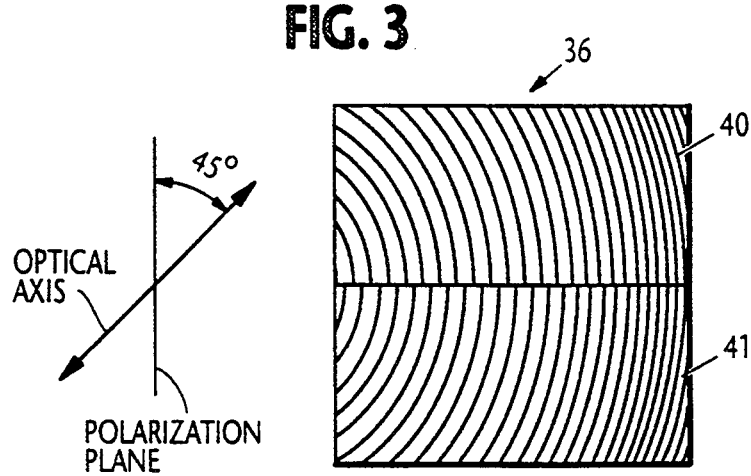
FIG. 3 is a plan view showing details of the diffracting plate of FIG. 2.

As shown in detail in FIG. 3, the holographic diffracting plate 36 is divided into two areas 40 and 41, each having a different diffraction pattern. Specifically, each of the areas 40 and 41 has a concentric diffraction pattern which is so formed that diffracting plate 36 as a whole produces an off-axis lens effect. It acts as a convex lens on the plus first-order component and as a concave lens on the minus first-order component. The optical axis of diffracting plate 36 is approximately 45° with respect to the polarization plane of the incident light.

Figure 4:
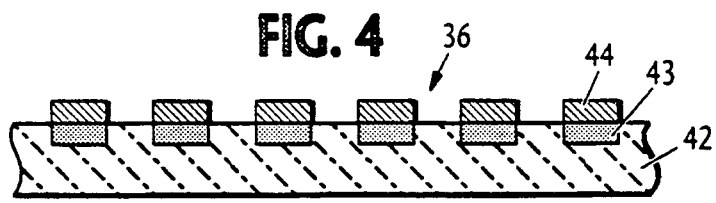
FIG. 4 is a cross-sectional view of the diffracting plate.

As illustrated in FIG. 4, diffracting plate 36 comprises a birefringent $LiNbO_3$ substrate 42 and a plurality of diffraction gratings each being formed by a lower, proton-exchanged region 43 embedded in the substrate 42 and an upper, dielectric film 44 formed of $Nb_2O_5$ which acts as a phase compensating film. The phase distribution, or phase difference between a successive "line" (formed by each dielectric film 44 and the underlying layer 43) and an adjacent "space" on the diffracting plate 36 is such that it does not act as a grating for the ordinary light by giving a zero phase shift and acts as a grating for the extraordinary light components by giving a $\pi$-radian phase shift.

Details of the light detector 37 are shown in FIG. 5. It comprises three sensing areas 50, 51 and 52. Sensing area 50, which is located between areas 51 and 52, is divided into sensors 50a and 50b, for receiving the zeroth-order light to allow an out-of-focus light spot 60 thereon, which divides itself equally between the two sensors 50a and 50b. Sensing area 51 is divided into four sensors 51a, 51b, 51c and 51d to be illuminated with focussed light spots 61 and 62 of the plus first-order light. Light spot 61 is formed, corresponding to the diffraction pattern 41, on the boundary between upper-left sensor 51a and lower-left sensor 51b, and the light spot 62 is formed, corresponding to the diffraction pattern 40, on the boundary between upper-right sensor 51c and lower-right sensor 51d. Sensing area 52 is divided into two sensors 52a and 52b to receive the minus first-order light which illuminates the sensor 52a with a lower semicircular light spot 63 corresponding to the diffraction patterns 41 and illuminates the sensor 52b with an upper semicircular spot 64 corresponding to the diffraction pattern 40.

By representing the electrical signal from each sensor as a voltage V with a subscript indicating the sensor from which it is generated, the following signals are produced:

$$F(=\text{Focussing}) = (V_{51b} + V_{51c} + V_{52b}) - (V_{51a} + V_{51d} + V_{52a})$$

$$T(=\text{Tracking}) = V_{50a} - V_{50b}$$

$$R(=\text{Readout signal}) = (V_{50a} + V_{50b}) - (V_{51b} + V_{51c} + V_{52b} + V_{51a} + V_{51d} + V_{52a})$$

The above relations are simplified as follows:

$$F = A - B \quad (1)$$

$$T = C - D \quad (2)$$

$$R = (C+D) - (A+B) \quad (3)$$

where, $$A = V_{51b} + V_{51c} + V_{52b} \quad (4)$$

$$B = V_{51a} + V_{51d} + V_{52a} \quad (5)$$

$$C = V_{50a} \quad (6)$$

$$D = V_{50b} \quad (7)$$

Component signal A is derived from an adder 70 by summing signals from sensors 51b, 51c and 52b, and component signal B from an adder 71 by summing signals from sensors 51a, 51d and 52a. A subtractor 72 is connected to the outputs of adders 70 and 71 to yield the focussing signal F. A subtractor 73 is connected to sensors 50a and 50b to produce the tracking control signal T. The outputs of adders 70 and 71 are connected to an adder 74 to produce an output A+B, and sensors 50a and 50b are further connected to an adder 75 whose output is connected to a subtractor 76 where it is combined with the output of adder 74 to produce the readout signal R.

It is seen from FIG. 5 that the configuration of the circuit for producing the components C and D (i.e., derived from the zeroth-order light component) of the readout signal is identical to the configuration of the circuit for producing the components A and B (i.e., derived from the first-order light components) of the readout signal. Additionally, the intensities of signals generated by each of these circuits are identical to those of signals generated by the other when the system is at an optimum condition. Therefore, any frequency dependent noise contained in the sum of components C and D is cancelled with frequency dependent noise contained in the sum of components A and B by subtractor 76. Therefore, the common-mode noise is completely eliminated from the readout signal at all frequencies.

Figure 6:
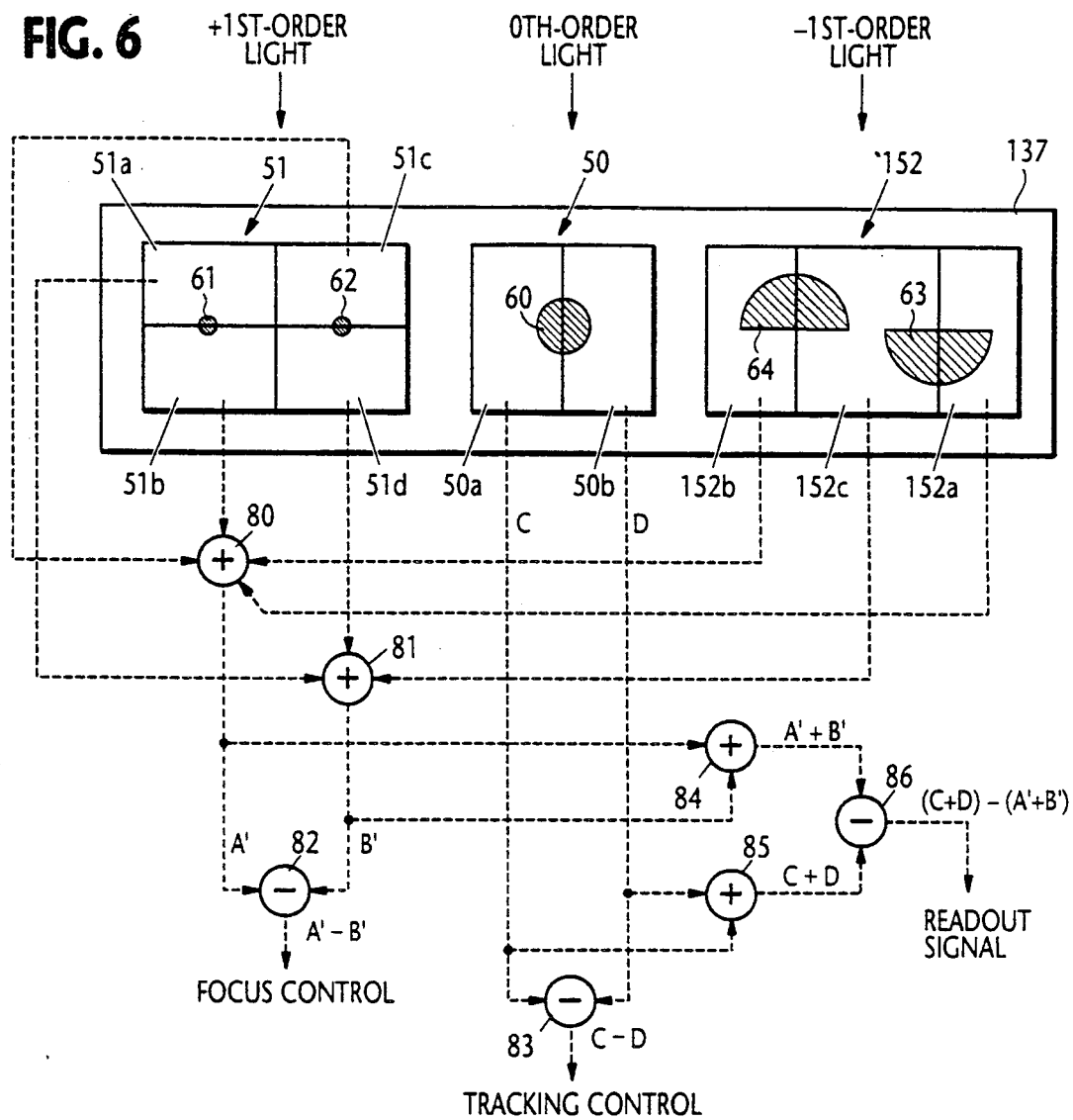
FIG. 6 is a plan view of a modified form of the light detector of FIG. 5, together with a circuit for processing signals from the light detector.

The light detector of FIG. 5 can be modified as shown at 137 in FIG. 6 by dividing the minus first-order light sensor 152 into three regions 152a, 152b and 152c so that light spot 63 equally illuminates right-side and center regions 152a and 152c and light spot 64 equally illuminates left-side and center regions 152b and 152c.

While the arrangement of FIG. 6 provides the same tracking control signal T, it gives the following focussing control signal F' and readout signal R':

$$F' = (V_{51b} + V_{51c} + V_{152a} + V_{152b}) - (V_{51a} + V_{51d} + V_{152c})$$

$$R' = (V_{50a} + V_{50b}) - (V_{51b} + V_{51c} + V_{152a} + V_{152b} + V_{51a} + V_{51d} + V_{152c})$$

The above relations are simplified as follows:

$$F' = A' - B' \quad (8)$$

$$R' = (C+D) - (A' + B') \quad (9)$$

where, $$A' = V_{51b} + V_{51c} + V_{152a} + V_{152b} \quad (10)$$

$$B' = V_{51a} + V_{51d} + V_{152c} \quad (11)$$

Component signal A' is derived with an adder 80 by summing signals from sensors 51b, 51c, 152a and 152b, and component signal B' with an adder 81 by summing signals from sensors 51a, 51d and 152c. Similar to the circuit arrangement of FIG. 5, a subtractor 82 is connected to the outputs of adders 80 and 81 to yield the focussing signal F'. A subtractor 83 is connected to sensors 50a and 50b to produce the tracking control signal T. The outputs of adders 80 and 81 are connected to an adder 84 to produce an output A'+B', and sensors 50a and 50b are further connected to an adder 85 whose output is connected to a subtractor 86 where it is combined with the output of adder 84 to produce the readout signal R'.

The light detector 137 of FIG. 6 offers an advantage over the light detector 37 of FIG. 5 in that if an imbalance exists between light spots 63 and 64 such imbalance is cancelled by the subtractor 82 and hence no focussing offset occurs.

An alternative form of the embodiment of FIG. 2 is shown in FIG. 7 in which the light detector is located as shown at 237 on the focal point of the minus first-order component, rather than the focal point of the plus first-order component, so that the zeroth-order and plus first-order components are focussed in front of the light detector 237.

As illustrated in FIG. 8, the arrangement of FIG. 7 differs from that of FIG. 2 in that the minus first-order light forms the focussed spot 61 on the boundary between upper-left and lower-left regions 251a and 251b of a sensing area 251 and the focussed spot 62 on the boundary between upper-right and lower-right sensors 251c and 251d of the sensing area 251 in a manner similar to the light spots 61 and 62 formed by the plus first-order light on the sensor 51 (FIG. 5). In addition, the plus first-order light forms the light spot 63 and 64 on the right-side and left-side sensors 252a and 252b of a sensing area 252 in a manner similar to the light spots 63 and 64 formed by the minus first-order light on the sensor 52 (FIG. 5). It is seen that the circuit used in processing the signals from the light detector 37 in FIG. 5 can also be used for processing the signals from light detector 237.

Figure 9:
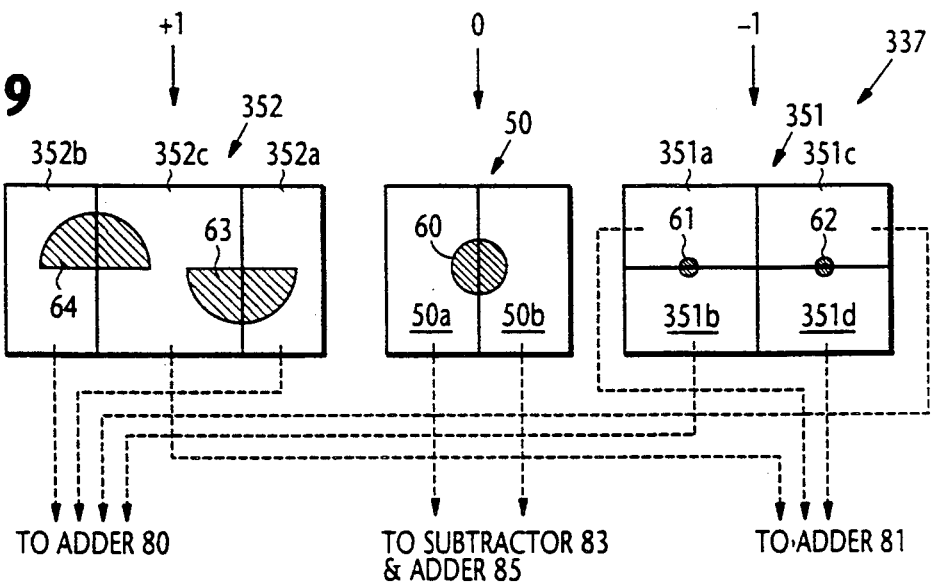
FIG. 9 is a plan view of a modified form of the light detector of FIG. 6 incorporated in the arrangement of FIG. 7.

The arrangement of FIG. 7 can also be used for a light detector 337 as shown in FIG. 9, instead of the light detector 137 of FIG. 6. The light detector 337 of FIG. 9 differs from that of FIG. 6 in that the minus first-order light forms the focussed spot 61 on the boundary between upper-left and lower-left sensors 351a and 351b of a sensing area 351 as well as the spot 62 on the boundary between upper-right and lower-right sensors 351c and 351d of the sensing area 351 in a manner similar to the light spots 61 and 62 formed by the plus first-order light on the sensing area 51 (FIG. 6). The plus first-order light forms the light spot 63 and 64 on the boundaries between sensors 352a, 352b and 352c of a sensing area 352 in a manner similar to the light spots 63 and 64 formed by the minus first-order light on the sensing area 152 (FIG. 6). The circuit used in processing the signals from the light detector 137 in FIG. 6 can also be used for processing the signals from the light detector 337 of FIG. 9.

FIG. 10 illustrates another embodiment of the present invention in which a polarizing holographic diffracting member 400 and a light detector 500 are provided. The diffracting member 400 has two major surfaces or first and second diffraction patterns 401 and 402. These diffraction patterns may be provided respectively on spaced apart diffracting plates 400A and 400B as illustrated in FIG. 11A. Alternatively, they can be formed respectively on the opposite principal surfaces of a single diffracting member 400C as shown in FIG. 11B.

As illustrated in FIGS. 12A and 12B, the first diffracting plane 401 is subdivided into two equal areas of parallel-striped diffraction patterns 403 and 404, and the second diffracting plane 402 is subdivided into two equal areas of parallel-striped diffraction patterns 405 and 406. The optical axis of the substrate of first diffraction plane 401 is $+45°$ with respect to the polarization plane of incident light so that the first diffraction plane 401 provides diffraction primarily on a particularly polarized component of incident light and splits it into plus and minus first-order diffracted components and allows the passage of a component that is polarized in a direction normal to that particular component as zeroth-order light. On the other hand, the optical axis of the substrate of second diffracting plane 402 is $-45°$ with respect to the polarization plane of incident light so that the second diffraction plane 402 provides diffraction primarily on a polarization component of light from the first plane 401 which polarization component is oriented in a direction normal to the direction of polarization of the zeroth-order light from the first diffracting plane 401 and splits it into plus and minus first-order components, while passing the plus and minus first-order components of light from the first diffracting plane 401.

Figure 13:
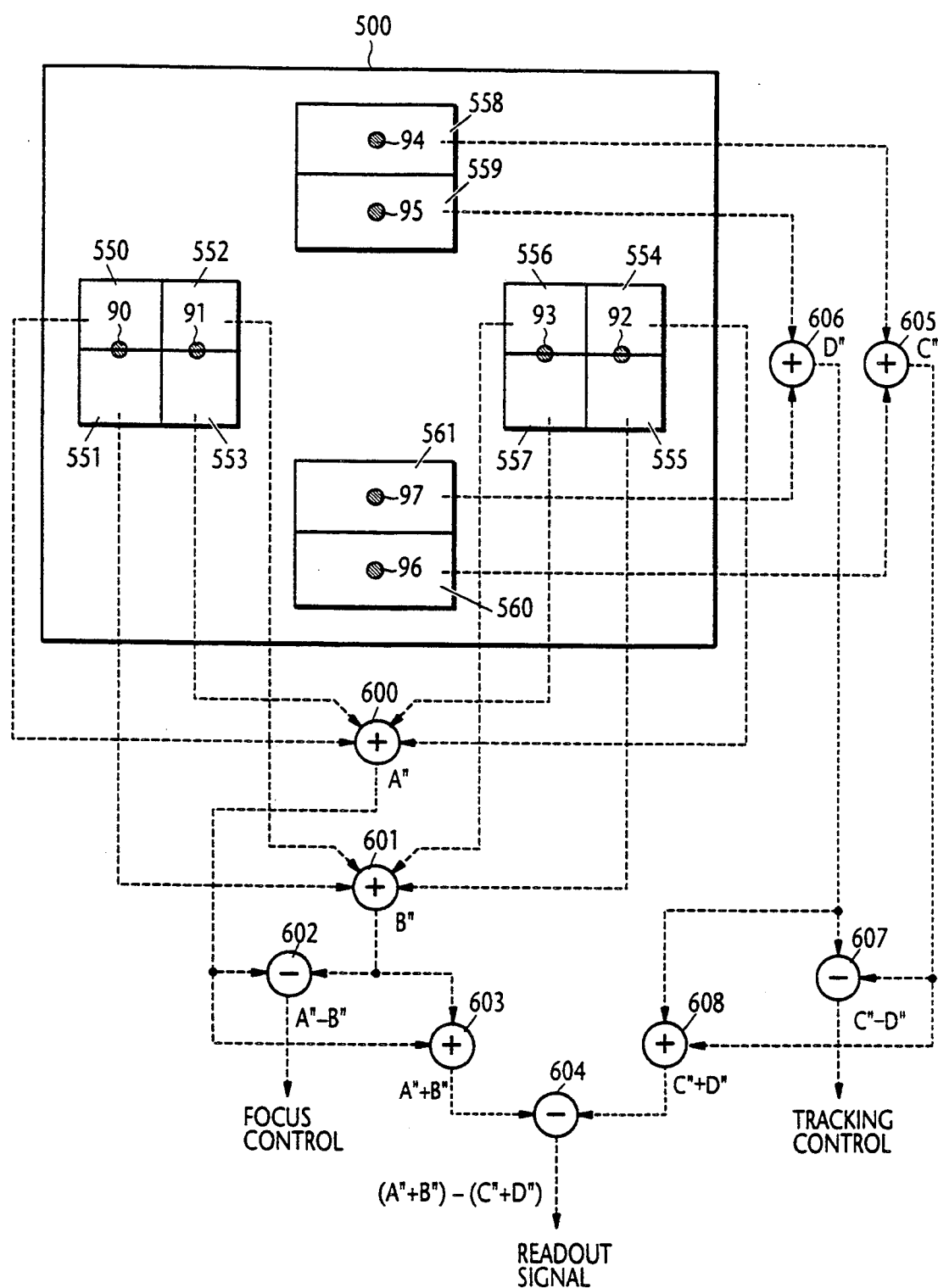
FIG. 13 is a plan view of the light detector of FIG. 10, together with a circuit for processing signals from the light detector.

Details of the light detector 500 and a circuit for processing the signals from the detector are shown in FIG. 13. Light detector 500 comprises four sensing areas. The left-side sensing area is orthogonally divided into upper-left, lower-left, upper-right and lower-right sensors 550, 551, 552 and 553, and the right-side sensing area is likewise divided into four sensors 554, 555, 556 and 557. The upper sensing area is divided into upper and lower sensors 558 and 559, and the lower sensing area is divided into lower and upper sensors 560 and 561.

In the left-side sensing area, the zeroth-order light from the first diffracting plane 401 as well as the plus first-order light from the diffraction pattern 405 of the second plane 402 form a focussed spot 90 on the boundary between the sensors 550 and 551 of the left-side sensing area, and the zeroth-order light from the first diffracting plane 401 as well as the plus first-order light from the diffraction pattern 406 of the second plane 402 form another spot 91 on the boundary between sensors 552 and 553.

In the right-side sensing area, the zeroth-order light from the first diffracting plane 401 as well as the minus first-order light from the diffraction pattern 405 of the second plane 402 form a focussed spot 92 on the boundary between the sensors 554 and 555, and the zeroth-order light form the first diffracting plane 401 as well as the minus first-order light from the diffraction pattern 406 of the second plane 402 form another spot 93 on the boundary between sensors 556 and 557.

In the upper sensing area, the plus first-order light from the diffraction pattern 403 of the first plane 401 as well as the zeroth-order light from the second diffracting plane 402 form a focussed spot 94 on the upper sensor 558, and the plus first-order light from the diffraction pattern 404 of the first plane 401 as well as the zeroth-order light from the second diffracting plane 402 form another spot 95 on the lower sensor 559.

In the lower sensing area, the minus first-order light from the diffraction pattern 403 of the first plane 401 as well as the zeroth-order light from the second diffracting plane 402 form a focussed spot 96 on the lower sensor 560, and the minus first-order light from the diffraction pattern 404 of the first plane 401 as well as the zeroth-order light from the second diffracting plane 402 form another spot 97 on the upper sensor 561.

The following relations are established to produce a focussing control signal F'', a tracking control signal T'' and a readout signal R'':

$$F''=(V_{550}+V_{553}+V_{554}+V_{557})-(V_{551}+V_{522}+V_{555}+V_{556})$$

$$T''=(V_{558}+V_{560})-(V_{559}V_{561})$$

$$R''=(V_{550}+V_{553}+V_{554}+V_{557})+(V_{551}+V_{552}+V_{555}+V_{556})-(V_{558}+V_{560}+V_{559}+V_{561})$$

The above relations are simplified as follows:

$$F''=A''-B'' \quad (12)$$

$$T''=C''-D'' \quad (13)$$

$$R''=(A''+B'')-(C''+D'') \quad (14)$$

where,
$$A''=V_{550}+V_{553}+V_{554}+V_{557} \quad (15)$$

$$B''=V_{551}+V_{552}+V_{555}+V_{556} \quad (16)$$

$$C''=V_{558}+V_{560} \quad (17)$$

$$D''=V_{559}+V_{561} \quad (18)$$

Component signal A'' is produced from an adder 600 by summing signals from sensors 550, 553, 554 and 557, and component signal B'' from an adder 601 by summing signals from sensors 551, 552, 555 and 556. A subtractor 602 is connected to the outputs of adders 600 and 601 to generate the focussing signal F". An adder 603 is connected to the outputs of adders 600 and 601 to apply a sum A"+B" to a subtractor 604. An adder 605 provides a sum of signals from sensors 558 and 560 and feeds it as the signal C" to a subtractor 607, and an adder 606 provides a sum of signals from sensors 559 and 561 and feeds it as the signals D" to subtractor 607 to generate the tracking signal T". To produce the readout signal R", an adder 608 is provided to feed a sum of the signals C" and D" to the subtractor 604.

It is seen from FIG. 13 that the configuration of the circuit for deriving the components (A"+B") of the readout signal R" from the zeroth-order light from the diffraction pattern 401 and the plus and minus first-order components of light from the diffraction pattern 402 is identical to that of the circuit for deriving the components (C"+D") of the readout signal R" from the plus and minus first-order components of light from the diffraction pattern 401 and the zeroth-order light from the pattern 402. Additionally, the intensities of signals generated by each of these circuits are identical to those of signals generated by the other when the system is at an optimum condition. Therefore, any frequency dependent noise contained in the signal A"+B" is cancelled with frequency dependent noise contained in the signal C"+D" by subtractor 604. Therefore, the common-mode noise is completely eliminated from the readout signal at all frequencies.

What is claimed is:

1. A magneto-optical head assembly comprising:
   a light source;
   optical means for directing light from the light source onto a magneto-optical recording medium and focussing light returning from said medium onto a given plane;
   a birefringent member formed with a diffraction pattern located in the path of light from said optical means to said given plane, said diffraction pattern splitting light incident thereon from said optical means into a zeroth-order component and plus and minus first-order components; and
   light detector means located on said given plane, said light detector means comprising a first light sensing area having two sensors for receiving the zeroth-order component, a second light sensitive area having a first pair of diagonally arranged sensors and a second pair of diagonally arranged sensors for receiving one of the plus and minus first-order components, and a third light sensitive area having two sensors for receiving the other first-order component.

2. A magneto-optical head assembly as claimed in claim 1, wherein said birefringent member has an off-axis lens effect and is divided into two regions of different diffraction patterns so that the plus and minus first-order components are respectively focussed on first and second focal planes and the zeroth-order component is focussed on a third focal plane between said first and second focal planes.

3. A magneto-optical head assembly as claimed in claim 2, wherein said given plane coincides with one of the first and second focal planes.

4. A magneto-optical head assembly as claimed in claim 1, wherein the two sensors of said third light sensitive area are arranged to respectively receive separated first and second beams of said other first-order component.

5. A magneto-optical head assembly as claimed in claim 4, wherein said third light sensitive area has a third sensor located between said two sensors of the third light sensitive area for receiving part of said first beam and part of said second beam.

6. A magneto-optical head assembly as claimed in claim 1, wherein said birefringent member has a first diffracting plane for diffracting a particular polarization component of light incident thereon and a second diffracting plane for diffracting a polarization component of light incident thereon from said first diffracting plane which polarization component is oriented in a direction normal to the direction of orientation of said particular polarization component, each of said first and second diffracting planes being divided into two regions of different diffraction patterns.

7. A magneto-optical head assembly as claimed in claim 6, wherein the first light sensitive area is arranged to receive light spots formed by the zeroth-order component from the second diffracting plane and formed by the plus first-order components from the respective regions of said first diffracting plane, the second light sensitive area is arranged to receive light spots formed by the zeroth-order component from the first diffracting plane and formed by the plus first-order components from the respective regions of said second diffracting plane, and the third light sensitive area is arranged to receive light spots formed by the zeroth-order component from the second diffracting plane and formed by the minus first-order components from the respective regions of the first diffracting plane, and wherein said light detector further comprises a fourth light sensitive area having a first pair of diagonally arranged sensors and a second pair of diagonally arranged sensors for receiving light spots formed by the zeroth-order component from the first diffracting plane and formed by the minus first-order components from the respective regions of said second diffracting plane.

8. A magneto-optical head assembly as claimed in claim 1, further comprising:
   a first adder for summing signals from the first pair of diagonally arranged sensors of the second light sensitive area and a signal from one of the sensors of said third light sensitive area,
   a second adder for summing signals from the second pair of diagonally arranged sensors of said second light sensitive area and a signal from the other sensor of said third light sensitive area,
   a third adder for summing output signals of said first and second adders;
   a fourth adder for summing signals from the sensors of said first light sensitive area;
   a first subtractor for producing a focussing control signal representative of the difference between output signals of said first and second adders;
   a second subtractor for producing a tracking control signal representative of the difference between signals from the sensors of said first light sensitive area; and
   a third subtractor for producing a readout signal representative of the difference between output signals of said third and fourth adders.

9. A magneto-optical head assembly as claimed in claim 5, further comprising:
   a first adder for summing signals from the first pair of diagonally arranged sensors of said second light sensitive area and signals from the first-mentioned two sensors of said third light sensitive area;

a second adder for summing signals from the second pair of diagonally arranged sensors of said second light sensitive area and a signal from the third sensor of said third light sensitive area;

a third adder for summing output signals of said first and second adders;

a fourth adder for summing signals from the sensors of said first light sensitive area;

a first subtractor for producing a focussing control signal representative of the difference between output signals of said first and second adders;

a second subtractor for producing a tracking control signal representative of the difference between signals from the sensors of said first light sensitive area; and a third subtractor for producing a readout signal representative of the difference between output signals of said third and fourth adders.

10. A magneto-optical head assembly as claimed in claim 7, further comprising:

a first adder for summing signals from the first pair of diagonally arranged sensors of said second light sensitive area and signals from the first pair of diagonally arranged sensors of said fourth light sensitive area;

a second adder for summing signals from the second pair of diagonally arranged sensors of said second light sensitive area and signals from the second pair of diagonally arranged sensors of said fourth light sensitive area;

a third adder for summing output signals of said first and second adders;

a fourth adder for summing signals from one of the sensors of the first light sensitive area and one of the sensors of the third light sensitive area;

a fifth adder for summing signals from the other sensor of the first light sensitive area and the other sensor of the third light sensitive area;

a sixth adder for summing output signals of said fourth and fifth adders;

a first subtractor for producing a focussing control signal representative of the difference between output signals of said first and second adders;

a second subtractor producing a tracking control signal representative of the difference between output signals of said fourth and fifth adders; and a third subtractor for producing a readout signal representative of the difference between output signals of said third and sixth adders.

* * * * *

UNITED STATES PATENT AND TRADEMARK OFFICE
CERTIFICATE OF CORRECTION

PATENT NO. : 5,353,267

DATED : October 4, 1994

INVENTOR(S) : Ryuichi Katayama

It is certified that error appears in the above-identified patent and that said Letters Patent is hereby corrected as shown below:

Column 8, line 45, after "$V_{559}$", insert -- + --.

Signed and Sealed this

Fourth Day of April, 1995

Attest:

BRUCE LEHMAN

Attesting Officer

Commissioner of Patents and Trademarks